United States Patent
Russo et al.

(10) Patent No.: US 9,622,021 B2
(45) Date of Patent: Apr. 11, 2017

(54) SYSTEMS AND METHODS FOR A ROBOTIC MOUNT

(71) Applicants: Jonathan Russo, La Jolla, CA (US); Michael Russo, San Diego, CA (US)

(72) Inventors: Jonathan Russo, La Jolla, CA (US); Michael Russo, San Diego, CA (US)

(73) Assignee: Dynamount, LLC, San Diego, CA (US)

( * ) Notice: Subject to any disclaimer, the term of this patent is extended or adjusted under 35 U.S.C. 154(b) by 0 days.

(21) Appl. No.: 14/632,304

(22) Filed: Feb. 26, 2015

(65) Prior Publication Data

US 2016/0004232 A1    Jan. 7, 2016

Related U.S. Application Data

(60) Provisional application No. 62/021,160, filed on Jul. 6, 2014.

(51) Int. Cl.

| | |
|---|---|
| *B25J 18/02* | (2006.01) |
| *H04W 4/00* | (2009.01) |
| *F16M 11/04* | (2006.01) |
| *F16M 11/08* | (2006.01) |
| *F16M 11/10* | (2006.01) |
| *F16M 11/18* | (2006.01) |
| *F16M 11/20* | (2006.01) |
| *F16M 11/24* | (2006.01) |
| *F16M 13/02* | (2006.01) |
| *H04R 1/02* | (2006.01) |

(52) U.S. Cl.
CPC .......... *H04W 4/008* (2013.01); *F16M 11/048* (2013.01); *F16M 11/08* (2013.01); *F16M 11/10* (2013.01); *F16M 11/18* (2013.01); *F16M 11/2028* (2013.01); *F16M 11/2085* (2013.01); *F16M 11/2092* (2013.01); *F16M 11/24* (2013.01); *F16M 13/02* (2013.01); *H04R 1/02* (2013.01); *H04R 2201/025* (2013.01)

(58) Field of Classification Search
CPC ........ F16M 11/08; F16M 11/10; F16M 11/12; Y10T 74/20305; Y10T 74/20317
USPC .......................................... 74/490.01–490.15
See application file for complete search history.

(56) References Cited

U.S. PATENT DOCUMENTS

| | | |
|---|---|---|
| 2,516,069 A | 7/1950 | Newhouse et al. |
| 2,526,604 A | 10/1950 | Dickenson et al. |
| 2,969,436 A | 1/1961 | Kilyk |

(Continued)

FOREIGN PATENT DOCUMENTS

| | | |
|---|---|---|
| CN | 203136096 U | 8/2013 |
| WO | 2007095950 A1 | 8/2007 |
| WO | 2014055436 A1 | 4/2014 |

OTHER PUBLICATIONS

International Search Report of Sep. 14, 2015 for PCT/US2015/037585.

*Primary Examiner* — Kevin Kim
(74) *Attorney, Agent, or Firm* — Christopher M. Ramsey; GrayRobinson, P.A.

(57) ABSTRACT

A robotic mount is disclosed that attaches onto any appropriate stand, framework, or other support structure. The mount can manipulate the position and orientation of affixed devices upon remote command received from any network connected device. A specific or sequence of positions/orientations can be precisely registered and promptly returned to on command.

19 Claims, 8 Drawing Sheets

(56) References Cited

U.S. PATENT DOCUMENTS

| | | | |
|---|---|---|---|
| 3,164,838 A | | 1/1965 | Heinrich |
| 3,997,061 A | * | 12/1976 | Sano ..................... A63H 31/08 |
| | | | 212/174 |
| 4,673,268 A | | 6/1987 | Wheeler et al. |
| 4,937,675 A | | 6/1990 | Starceski et al. |
| 5,073,824 A | | 12/1991 | Vertin |
| 5,265,490 A | * | 11/1993 | Azuma ................... B25J 9/041 |
| | | | 74/490.04 |
| 5,436,542 A | | 7/1995 | Petelin et al. |
| 5,454,042 A | | 9/1995 | Drever |
| 5,463,432 A | | 10/1995 | Kahn |
| 5,611,508 A | | 3/1997 | Palmero |
| 6,105,454 A | * | 8/2000 | Bacchi ................... B25J 9/042 |
| | | | 414/744.5 |
| 7,071,898 B2 | | 7/2006 | Hobgood et al. |
| 7,140,789 B1 | | 11/2006 | Reinert |
| 7,672,270 B2 | | 3/2010 | Roggero et al. |
| 7,802,802 B2 | | 9/2010 | Gordon |
| 8,234,968 B2 | | 8/2012 | Hodge |
| 8,320,588 B2 | | 11/2012 | McPherson |
| 8,345,911 B2 | | 1/2013 | Fulks |
| 8,516,943 B2 | | 8/2013 | Rogers |
| 2005/0156122 A1 | | 7/2005 | Radahl |
| 2008/0041183 A1 | | 2/2008 | Todorov |
| 2008/0187464 A1 | * | 8/2008 | Guo ....................... G02B 21/34 |
| | | | 422/400 |
| 2008/0267613 A1 | | 10/2008 | Darrow |
| 2008/0316368 A1 | | 12/2008 | Fritsch et al. |
| 2010/0201807 A1 | | 8/2010 | McPherson |
| 2013/0093351 A1 | * | 4/2013 | Chiu ...................... B60Q 1/245 |
| | | | 315/291 |
| 2014/0233764 A1 | | 8/2014 | Mathis |

* cited by examiner

SYSTEMS AND METHODS FOR A ROBOTIC MOUNT

CROSS-REFERENCE TO RELATED APPLICATIONS

This application claims the benefit of U.S. Provisional Application No. 62/021,160, having filing date of Jul. 6, 2014 the disclosure of which is hereby incorporated by reference in its entirety and all commonly owned.

FIELD OF THE INVENTION

The embodiments described herein relate generally to the technical field of network connected robotics. More particularly, the present invention relates to controllable hardware mounts.

BACKGROUND OF THE INVENTION

In certain applications, particularly in connection with audio/video engineering and photography, an ability to remotely manipulate the position and orientation of employed hardware is desirable. Additionally, an ability to register a specific or sequence of positions/orientations to be returned to on remote command is also desirable. For example, when positioning a microphone to capture sound from a loudspeaker, musical instrument, vocalist, or any other source, even a very small modification to the microphone position relative to the sound source can have a large effect on the captured audio characteristics, or tone. Audio engineers will typically test multiple microphone positions and orientations relative to the target sound source in an attempt to locate the microphone position/orientation that produces the desired tone. Conventional microphone stands are static, as are the mounts that attach to them and support the microphone; their positions/orientations cannot be modified without physical manipulation by hand. It is not an uncommon experience to repeatedly walk between the microphone location (live room, stage, isolation booth, etc.) and the monitoring location (control room, sound board, etc.) making position modifications by hand and comparing the captured tones. Further, it is exceedingly difficult to test multiple possible microphone positions and then return to a previous position if the tone there is favored.

There exist remote controlled microphone stands that allow for the manipulation of the stand along various axes using a custom controller. Such devices are typically bulky and expensive since it is a significant portion of the stand itself that is being manipulated. Such devices are also limited in versatility; they function as standalone units whereas audio engineers typically employ a variety of different microphone stand types to meet dimensional and positional requirements for a wide array of audio capturing applications. Such devices are also inefficient as they typically require the use of a custom controller for remote manipulation as opposed to a controlling device already possessed by the operator.

Similarly, when capturing an image or video for a wide variety of applications (e.g., filmmaking, surveillance, etc.) it is often desirable to have the camera execute movements relative to the subject being photographed. For example, many surveillance cameras are mounted to remote control pan/tilt mounts enabling them to change orientation. Such devices are limited in versatility; they only permit orientation manipulation and not position manipulation which would be useful for such applications as peeking around a corner. In another example, photographers and filmmakers will typically employ devices such as remote controlled dollies for camera motion along an axis. Such devices are typically bulky and expensive making them excessive for many applications. Such devices are also limited in versatility; they only permit position manipulation along a single axis when control in multiple dimensions is often desirable. Such devices are also inefficient as they typically require the use of a custom controller for remote manipulation as opposed to a controlling device already possessed by the operator.

SUMMARY OF THE INVENTION

In one embodiment, a mount system is disclosed that comprises a first movable platform having a first axis along its length; a first motor engaged to the first movable platform and configured to control sliding motion of the first movable platform along the first axis; a device coupler configured to couple the first movable platform to an attached device; a second motor encased in the device coupler and configured to enable at least one of panning and rotation of the attached device; a wireless network connection device; and a microcontroller/CPU device configured to receive control signals from the wireless network connection device and responds by activating one or more of the motors.

In another embodiment, a robotic mount is disclosed that comprises a first movable platform having a first axis along its length; a second motor engaged to a second movable platform and configured to slide the second movable platform along the first axis; a wireless network connection device; and a microcontroller/CPU device; wherein the microcontroller/CPU device is configured to receive control signals from the wireless network connection device and respond by activating one or more of the motors.

The present invention further discloses a method for remote control of one or more mounts, wherein each mount comprises a wireless network connection device, a microcontroller/CPU device, a plurality of motors and a plurality of movable platforms; the method comprising: receiving control signals from a controlling device through a wireless network connection by one or more of the wireless network connection devices; communicating the received control signals to the corresponding microcontroller/CPU device; and activating one or more of the motors to adjust one or more of the plurality of movable platforms by the corresponding microcontroller/CPU device, according to the control signals.

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which.

Figure 1:
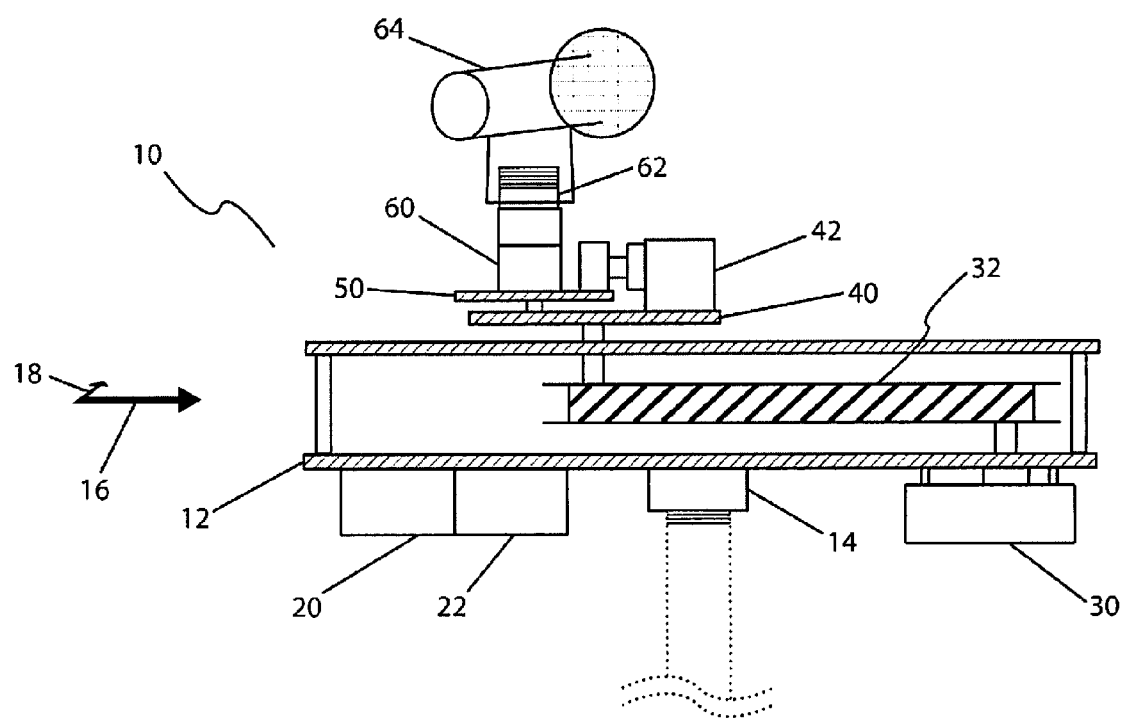
FIG. 1 illustrates a side view of an exemplary robotic mount of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE EMBODIMENTS

It will be appreciated that numerous specific details are set forth in order to provide a thorough understanding of the exemplary embodiments described herein. However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

Figure 2:
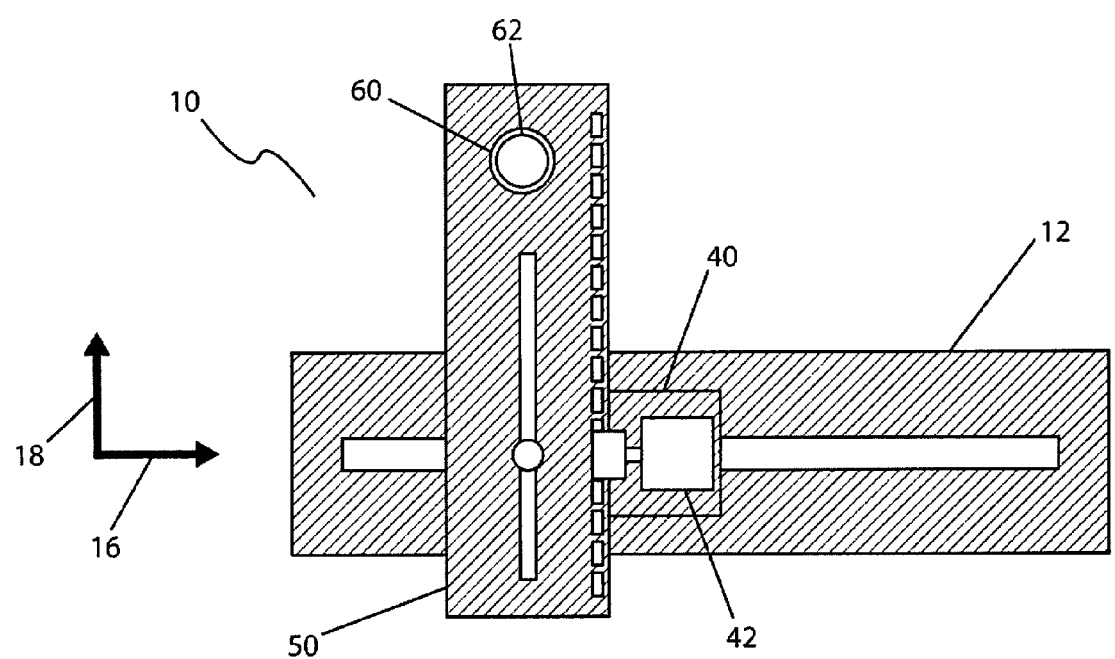
FIG. 2 illustrates a top view of the robotic mount of FIG. 1.

Referring now to FIG. 1 and FIG. 2 to describe technical aspects of the invention in more detail, there is shown an exemplary embodiment in which a hardware mount 10 serves as a microphone mount having a primary framework 12 which may be connected to any microphone stand via a coupler 14. For example, the coupler may be (but is not limited to) a threaded adapter, a fit-in housing, a tripod head, etc. Affixed to the primary framework 12 are a wireless network connection device 20, as well as a microcontroller/CPU device 22 and a primary servomechanism (servo) 30. The primary servo 30 drives a timing belt 32 that is connected to a first moving platform 40, enabling it to engage in controlled motion along a primary axis 16. Affixed to the first moving platform 40 is a secondary servo 42 that drives the motion of a second moving platform 50 along a secondary axis 18 perpendicular to the primary axis 16. Affixed to the second moving platform 50 is a tertiary servo 60 encased in a second coupler 62 (e.g. a threaded adapter) enabling the rotation/panning of any attached microphone 64.

In further detail, still referring to the invention of FIG. 1 and FIG. 2, the primary framework 12 may be sufficiently wide to allow for an adequate range of motion of the first moving platform 40 such that it may extend across the width of most common sound sources (such as a guitar cabinet speaker, drum head, etc.), typically 4 to 24 inches. The second moving platform 50 may be sufficiently long to allow for a similar range of motion in the axis 18 perpendicular to the primary axis 16, typically 4 to 24 inches. The hardware mount 10 may be made of metal or of any other sufficiently rigid and strong material such as high-strength plastic, wood, and the like. Further, the various components of the hardware mount 10 can be made of different materials. The type of material used would not change the way the invention works.

In an exemplary embodiment, the hardware mount system 10 serves as a microphone mount and that may include a microphone cable input and output to enable the captured audio signal to be analyzed in real time by the device. This permits the automation of various position and orientation manipulation sequences while analyzing captured frequency data in processes designed to determine the optimal microphone position/orientation for a given application, replacing manual techniques such as "shavering".

Figure 3:
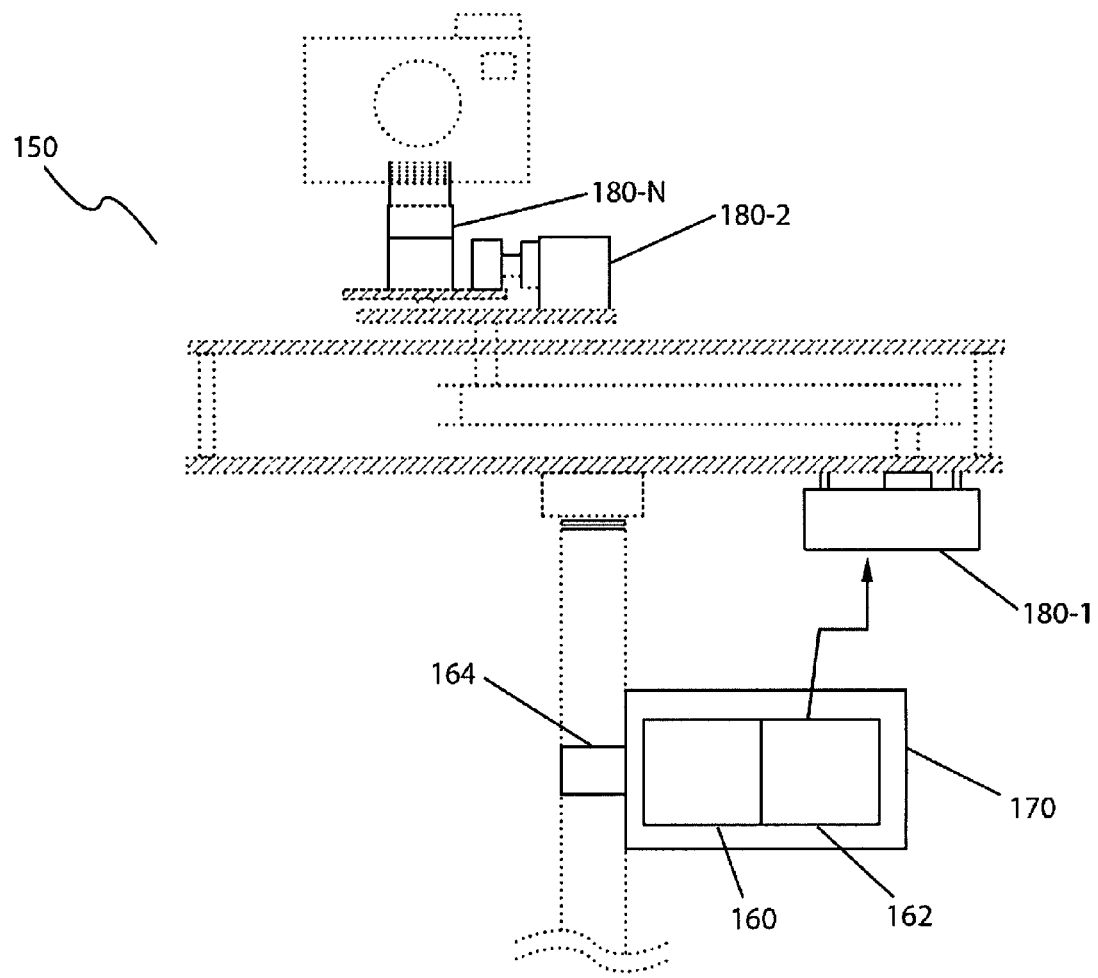
FIG. 3 illustrates a side view illustrating an exemplary embodiment of the hardware mount where an attachable control box is provided as a separate unit.

Referring now to FIG. 3, there is shown another exemplary embodiment of a hardware mount system 150 that includes a separate but attachable control box 170. The control box 170 contains both a wireless network connection device 160 and microcontroller/CPU device 162. The control box 170 may be affixed using a fastening device 164 (e.g., clamping bracket, socket tee, bolts, suction cups, adhesive, or other means) to the shaft of the stand to which the mount is attached. Alternatively, the fastening device 164 could be used to affix the control box 170 to any other suitable framework or support structure. The microcontroller/CPU device 162 receives control signals from the wireless network connection device 160 and responds by activating one or a more servos, stepper motors, linear actuators, or other similar devices (180-1 to 180-N) through either electrical wire or wireless close-range communication means in order to manipulate the position and orientation of the mounted hardware.

Figure 4:
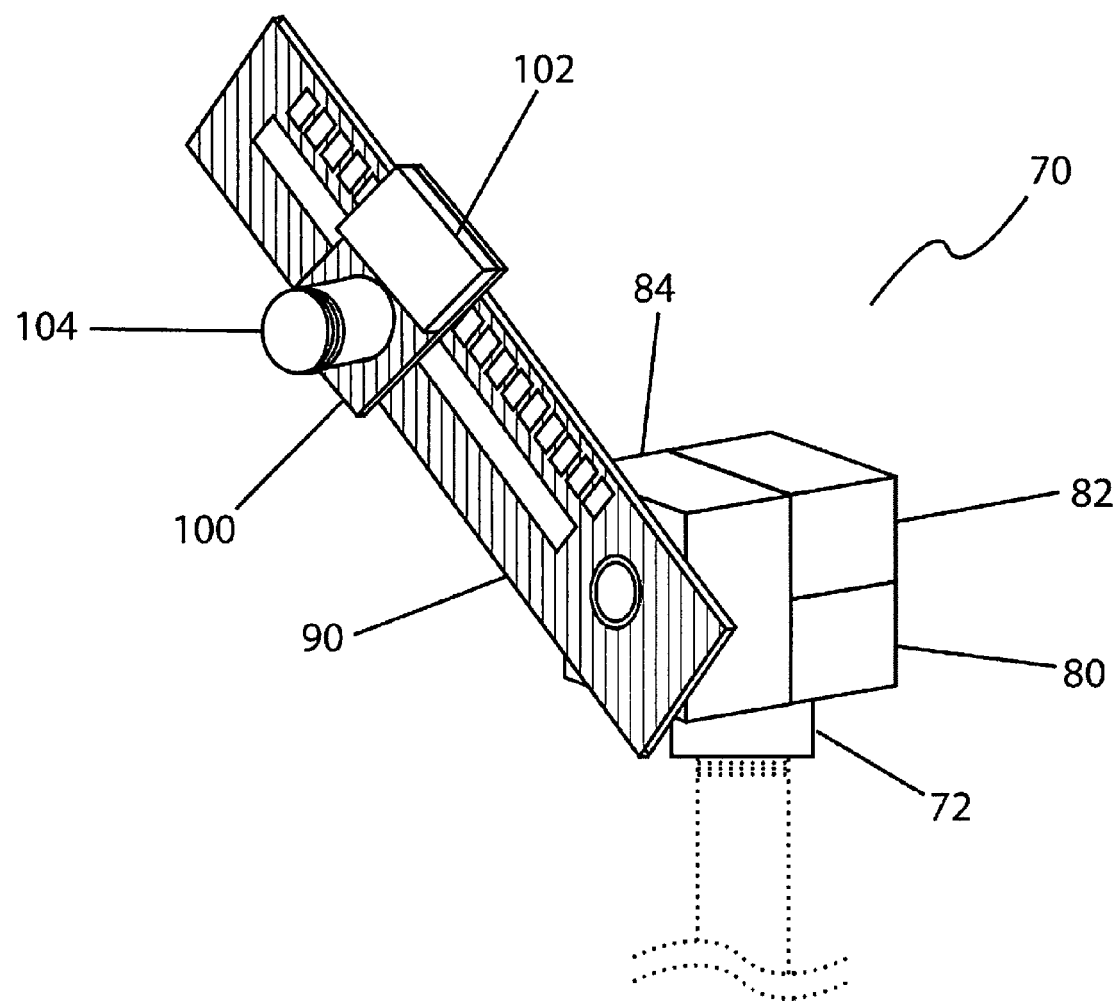
FIG. 4 illustrates a perspective view of another robotic mount as embodied in the present invention.

Referring to FIG. 4, there is shown an alternative embodiment in which a robotic hardware mount 70 serves as a microphone mount which may be connected to any microphone stand via a threaded adapter 72. Affixed to the threaded adapter 72 are a wireless network connection device 80, as well as a microcontroller/CPU device 82 and a primary servo 84. The primary servo 84 drives the first moving platform 90, enabling it to engage in controlled rotational motion. A secondary servo 102 is affixed to a second moving platform 100, enabling the second moving platform 100 to engage in controlled motion along the axis 94 of the first moving platform 90. Affixed to the second moving platform 100 is a linear actuator 104 encased in a threaded adapter onto which any standard microphone may be attached. The linear actuator 104 enables motion of the threaded adapter and the attached microphone along a direction perpendicular to the length of the first moving platform 90.

In further detail, still referring to the invention of FIG. 4, the first moving platform 90 is sufficiently long to allow for an adequate range of motion of the second moving platform 100 such that it may extend across the width of most standard sound sources (such as a guitar cabinet speaker, drum head, etc.), e.g. 4 to 24 inches. The hardware mount 70 may be made of metal or of any other sufficiently rigid and strong material such as high-strength plastic, carbon fiber, and the like. Further, the various components of the hardware mount 70 can be made of different materials. The type of material used would not change the way the invention works.

Figure 5:
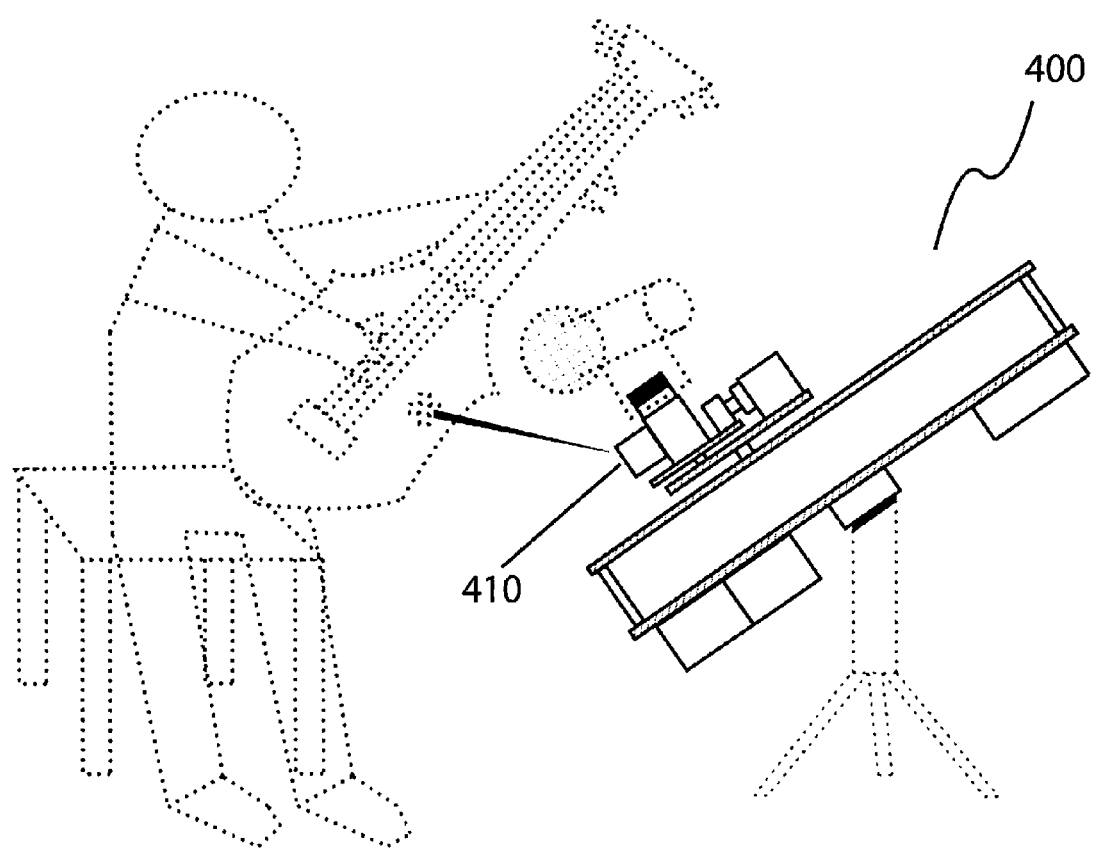
FIG. 5 illustrates a perspective view illustrating an exemplary application of the robotic mount of the present invention employed as a microphone stand.

Referring now to FIG. 5, there is shown an exemplary embodiment in which a hardware mount 400 serves as a microphone mount operating at an angle relative to the horizon which is similar to the angle of the sound source. In this embodiment the hardware mount 400 employs an affixed laser 410 as a means of projecting its relative position/orientation onto the sound source. Optionally, a camera may be affixed to the hardware mount 400 so that the position/orientation of the attached microphone can be observed from a remote controlling location. The laser 410 could also be used as a targeting/tracking device or measuring device to determine the precise distance from the subject of interest.

Figure 6:
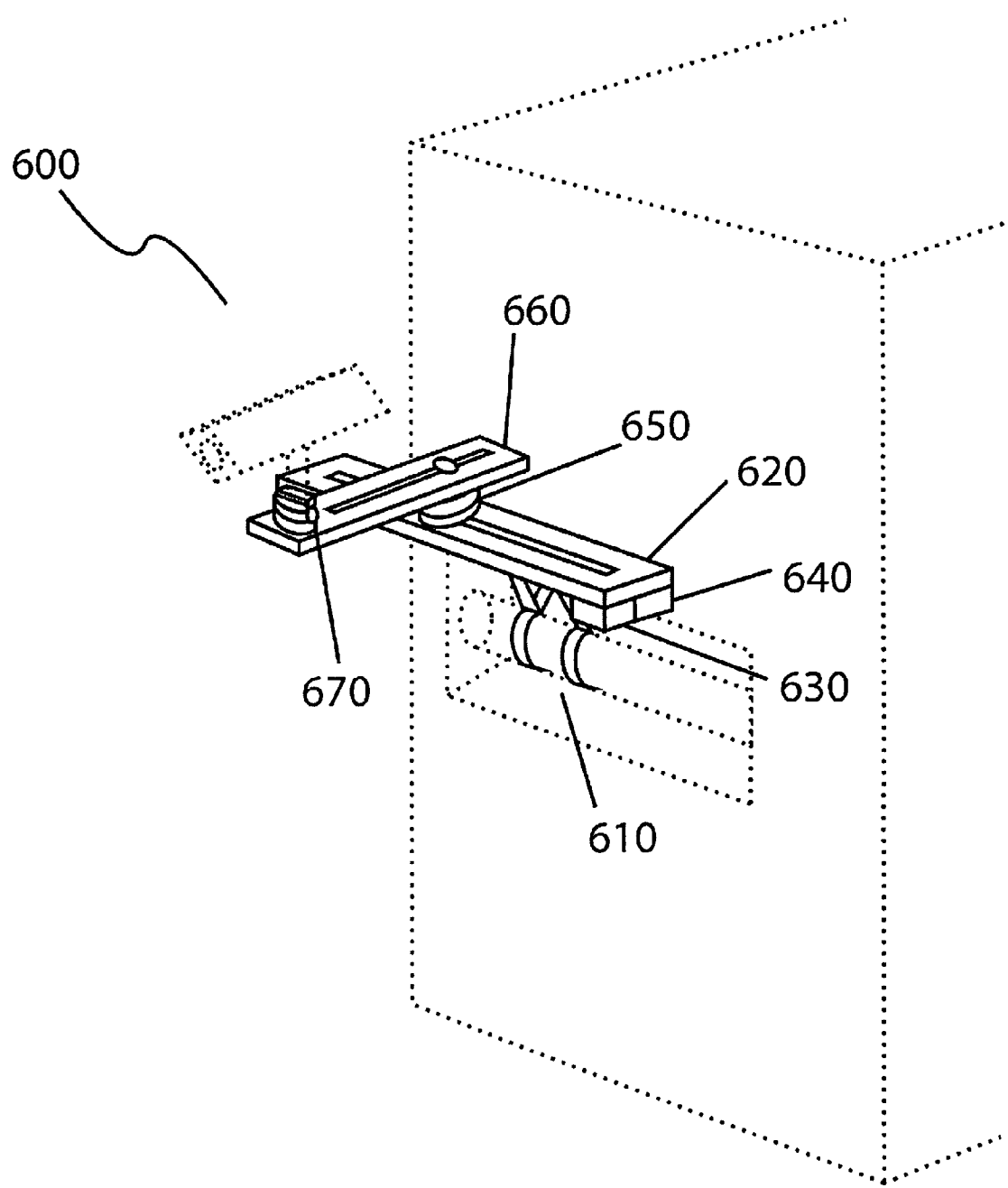
FIG. 6 illustrates a perspective view illustrating another exemplary application of the robotic mount of the present invention employed as a video camera stand.

Referring now to FIG. 6, there is shown another exemplary embodiment in which a hardware mount 600 serves as a video camera mount which attaches to an appropriate support structure using a fastening device 610 (e.g., clamping bracket, socket tee, bolts, suction cups, adhesive, or other means). The fastening device 610 is affixed to a primary platform 620 which also houses a wireless network connection device 630 and microcontroller/CPU device 640. A slider hub 650 contains a pair, trio, or combination of servos, stepper motors, linear actuators or similar devices enabling it to engage in controlled motion along a primary axis, to manipulate the position of a secondary platform 660 along a secondary axis, and to engage the secondary platform 660 in controlled rotational motion. Affixed to one end of the secondary platform 660 is a pan/tilt mechanism 670 onto which the surveillance camera is attached.

Figure 7:
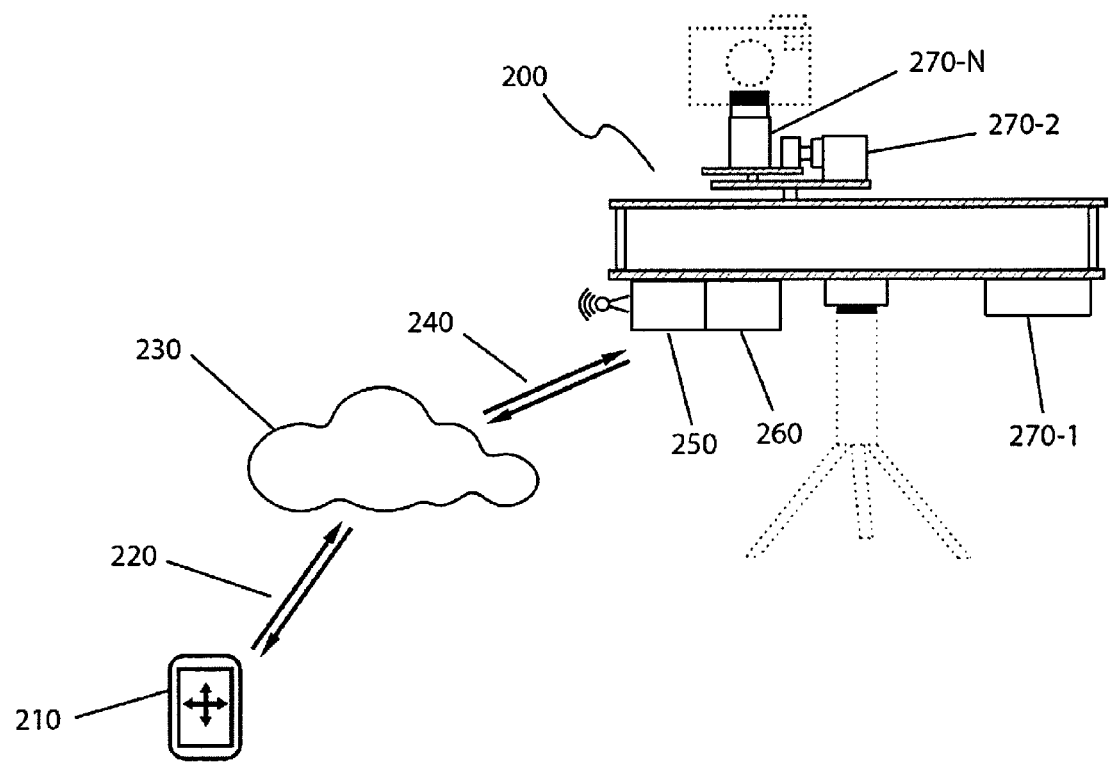
FIG. 7 illustrates a method for remotely controlling a robotic mount as embodied in the present invention.

Referring now to FIG. 7, there is shown a remote controlling device 210 (e.g., mobile phone, tablet, laptop computer, desktop computer, etc.) with graphical user interface that communicates through a network connection 220 with a server 230 which in turn communicates through a wireless network connection 240 with a wireless network connection device 250 affixed to a robotic hardware mount 200. The wireless network connection device 250 communicates directly (e.g., electrical wire, PCB, etc.) with a microcontroller/CPU device 260 which is also affixed to the robotic hardware mount 200. A remote controlling device 210 sends control signals through the described communication chain to a microcontroller/CPU device 260 which responds to the control signals by activating one or a plurality of servos, stepper motors, linear actuators, or other similar devices (270-1 to 270-N) and thus manipulating the position/orientation of mounted hardware. In addition, control signals for lasers, cameras, and other devices affixed to the robotic hardware mount 200 can be sent from the remote controlling device 210 through the described communication chain to the microcontroller/CPU device 260. The microcontroller/CPU device 260 sends data (e.g., camera footage, audio signal, etc.) from the robotic hardware mount 200 back through the communication chain to the remote controlling device 210 for viewing, analytics, or any other desired use.

Figure 8:
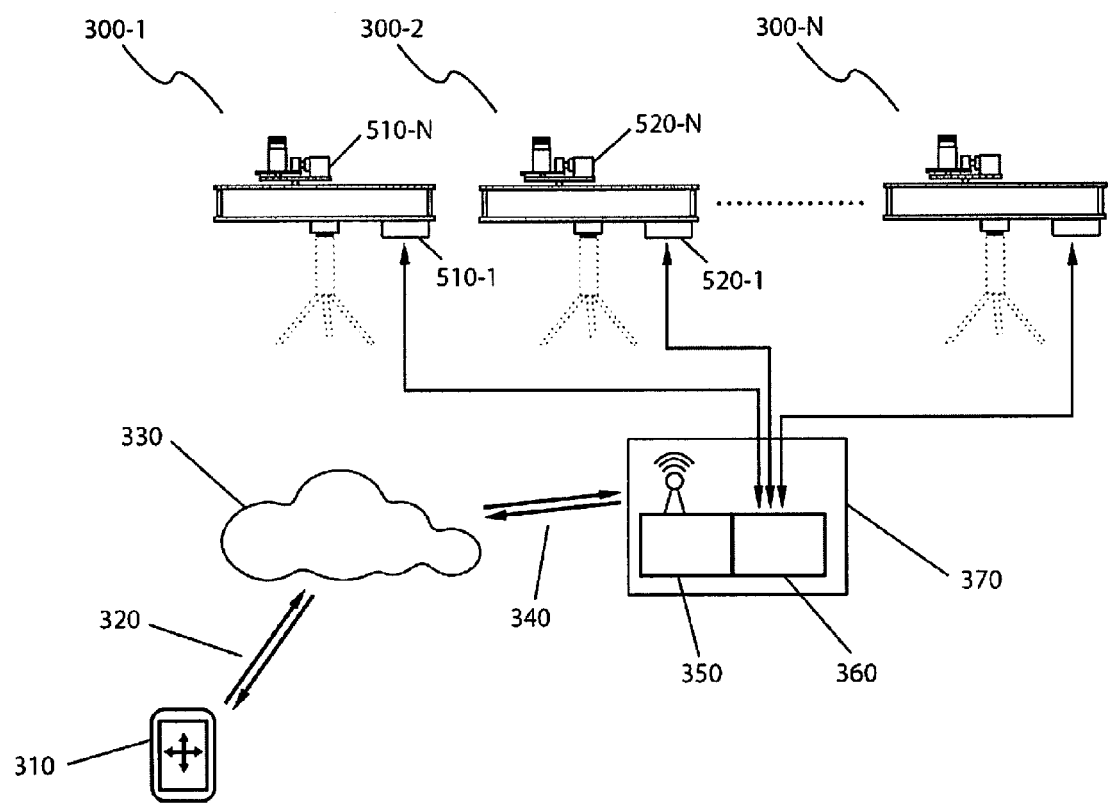
FIG. 8 illustrates a method for remotely controlling a plurality of robotic mounts.

Referring now to FIG. 8, there is shown a remote controlling device 310 with graphical user interface that communicates through a network connection 320 with a server 330 which in turn communicates through wireless network connection 340 with a wireless network connection device 350. The wireless network connection device 350 communicates directly with a microcontroller/CPU device 360. Both the wireless network connection device 350 and the microcontroller/CPU device 360 are housed within a control box 370 that is external to the one or plurality of robotic hardware mounts (300-1 to 300-N). A remote controlling device 310 sends control signals through the described communication chain to a microcontroller/CPU device 360 which responds to the control signals by activating one or a plurality of servos, stepper motors, linear actuators, or other similar devices (510-1 to 510-N, 520-1 to 520-N, etc.) housed within the one or plurality of robotic hardware mounts (300-1 to 300-N) and thus independently manipulating the position/orientation of each mounted piece of hardware. In addition, control signals for lasers, cameras, and other devices affixed to the one or plurality of robotic hardware mounts (300-1 to 300-N) can be sent from the remote controlling device 310 through the described communication chain to the microcontroller/CPU device 360. The microcontroller/CPU device 360 sends data (e.g., camera footage, audio signal, etc.) from the one or plurality of robotic hardware mounts (300-1 to 300-N) back through the communication chain to the remote controlling device 310 for viewing, analytics, or any other desired use.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

That which is claimed is:

1. A mount system comprising:
   a first movable platform having a first axis along its length;
   a first motor engaged with the first movable platform and configured to control sliding motion of the first movable platform along the first axis;
   a device coupler configured to couple the first movable platform to a microphone head;
   a second motor encased in the device coupler and configured to enable at least one of panning and rotation of the microphone head;
   a wireless network connection device;
   a microcontroller configured to receive control signals from the wireless network connection device and respond by activating one or more of the motors; and
   an input and output to enable analysis of captured audio signals and to control position and orientation of the microphone head in real time.

2. The mount system of claim 1, wherein the system further comprises:
   a framework having a second axis along its length that is perpendicular to the first axis;
   a second movable platform attached to the first movable platform; and
   a third motor engaged to the second movable platform and configured to drive the first movable platform along the second axis.

3. The mount system of claim 2, wherein the system further comprises a timing belt connected to the first movable platform and driven by the third motor.

4. The mount system of claim 2, wherein the microcontroller and the wireless network connection device are affixed to the framework.

5. The mount system of claim 2, further comprising a stand coupler configured to couple the mount to a microphone stand.

6. The mount system of claim 1, wherein the microcontroller and the wireless network connection device are in a control box, wherein the control box comprises a fastening means.

7. The mount system of claim 1, wherein the microcontroller and the wireless network connection device communicate with each other via close-range communication means.

8. The mount system of claim 1, wherein the microcontroller and the wireless network connection device communicate with each other via electrical wires.

9. The mount system of claim 1, wherein the input is a cable input and the output is a cable output.

10. The mount system of claim 1, wherein the system further comprises a laser source configured to align position and orientation of the mount relative to a sound source.

11. The mount system of claim 1, wherein the system further comprises a camera affixed to the mount configured to enable remote observation of the position and orientation of the microphone head.

12. The mount system of claim 1, wherein the mount is set to operate at an angle relative to the horizon similar to that of a sound source.

13. The mount system of claim 1, wherein the wireless network connection device remotely communicates with a controlling device through a wireless network connection.

14. The mount system of claim 1, wherein the motors are set to reference values when the system is turned on.

15. A mount system comprising:
   a first movable platform having a first axis along its length;
   a first motor engaged to the first movable platform and configured to control rotational motion of the first movable platform about a second axis perpendicular to the first axis;
   a second movable platform having a device coupler coupled to a microphone head;
   a second motor engaged to the second movable platform and configured to slide the second movable platform along the first axis;
   a wireless network connection device; and
   a microcontroller configured to receive control signals from the wireless network connection device and respond by activating one or more of the first motor and second motor;
   wherein the mount further comprises a linear actuator, encased in a device adapter and affixed to the second platform, configured to enable linear motion of the device adapter in a direction perpendicular to the first axis.

16. The mount system of claim 15, wherein the mount further comprises a stand coupler configured to couple the mount to a microphone stand.

17. A method for remote control of position and orientation of one or more microphone mounts, wherein each microphone mount comprises a wireless network connection device, a microcontroller, a plurality of motors and a plurality of movable platforms; the method comprising:
   receiving control signals from a controlling device through a wireless network connection by one or more of the wireless network connection devices, the control signals being determined by analyzing audio signals captured from a corresponding microphone in real-time;
   communicating the received control signals to the corresponding microcontroller; and
   activating one or more of the motors to adjust one or more of the plurality of movable platforms by the corresponding microcontroller, according to the control signals.

18. The method of claim 17, wherein coordinates of the plurality of moving platforms are communicated back to the controlling device through the wireless network connection.

19. The method of claim 18, wherein the coordinates of the plurality of moving platforms are stored in memory for future reset of the movable platforms.

* * * * *